United States Patent
Nam et al.

(10) Patent No.: US 11,670,766 B2
(45) Date of Patent: Jun. 6, 2023

(54) POSITIVE ELECTRODE ACTIVE MATERIAL FOR LITHIUM SECONDARY BATTERY, METHOD FOR PREPARING SAME, AND LITHIUM SECONDARY BATTERY COMPRISING SAME

(71) Applicants: POSCO, Pohang-si (KR); Research Institute of Industrial Science & Technology, Pohang-si (KR)

(72) Inventors: Sang Cheol Nam, Seoul (KR); Jae Won Lee, Cheonan-si (KR); Jong Il Park, Pohang-si (KR); Jae Myung Lee, Pohang-si (KR); Geun Gyung Park, Gwangju (KR)

(73) Assignees: POSCO HOLDINGS INC., Seoul (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 311 days.

(21) Appl. No.: 16/468,874

(22) PCT Filed: Dec. 7, 2017

(86) PCT No.: PCT/KR2017/014321
§ 371 (c)(1),
(2) Date: Jun. 12, 2019

(87) PCT Pub. No.: WO2018/110899
PCT Pub. Date: Jun. 21, 2018

(65) Prior Publication Data
US 2020/0106095 A1    Apr. 2, 2020

(30) Foreign Application Priority Data
Dec. 12, 2016 (KR) .................. 10-2016-0168830

(51) Int. Cl.
*H01M 4/505* (2010.01)
*H01M 4/131* (2010.01)
(Continued)

(52) U.S. Cl.
CPC ............ *H01M 4/505* (2013.01); *C01G 53/50* (2013.01); *H01M 4/131* (2013.01); *H01M 4/525* (2013.01);
(Continued)

(58) Field of Classification Search
None
See application file for complete search history.

(56) References Cited

U.S. PATENT DOCUMENTS 6,589,499 B2   7/2003   Gao et al.
8,277,980 B2   10/2012  Chang et al.
(Continued)

FOREIGN PATENT DOCUMENTS

CN   102315434 A   1/2012
CN   102347510 A   2/2012
(Continued)

OTHER PUBLICATIONS

International Search Report issued in International Application No. PCT/KR2017/014321 dated Mar. 23, 2018, with English translation.
(Continued)

*Primary Examiner* — Zhongqing Wei
(74) *Attorney, Agent, or Firm* — Morgan, Lewis & Bockius LLP

(57) ABSTRACT

A positive electrode active material for a lithium secondary battery according to an embodiment of the present invention includes a lithium transition metal composite oxide and doping metals doped in the lithium-transition metal composite oxide, wherein the doping metals includes at least two
(Continued)

kinds and the average oxidation number of the doping metals is greater than 3.5.

7 Claims, 9 Drawing Sheets

(51) Int. Cl.
*H01M 4/525* (2010.01)
*H01M 10/0525* (2010.01)
*C01G 53/00* (2006.01)
*H01M 4/02* (2006.01)

(52) U.S. Cl.
CPC ..... *H01M 10/0525* (2013.01); *C01P 2002/52* (2013.01); *C01P 2002/60* (2013.01); *C01P 2002/72* (2013.01); *C01P 2002/76* (2013.01); *C01P 2002/85* (2013.01); *C01P 2006/40* (2013.01); *H01M 2004/028* (2013.01)

(56) References Cited

U.S. PATENT DOCUMENTS

| | | |
|---|---|---|
| 2011/0140036 A1 | 6/2011 | Chang et al. |
| 2011/0226985 A1 | 9/2011 | Park et al. |
| 2012/0270107 A1 | 10/2012 | Toya et al. |
| 2013/0260262 A1 | 10/2013 | Miyazaki et al. |
| 2015/0118564 A1 | 4/2015 | Shimokita et al. |

FOREIGN PATENT DOCUMENTS

| | | | |
|---|---|---|---|
| CN | 103456916 A | | 12/2013 |
| CN | 103687813 A | | 3/2014 |
| CN | 104810512 A | | 7/2015 |
| EP | 2413415 A1 | | 2/2012 |
| EP | 2413415 A1 | * | 2/2012 ............ H01M 4/622 |
| EP | 2653447 A1 | | 10/2013 |
| EP | 2654109 A1 | | 10/2013 |
| EP | 3026738 A1 | | 6/2016 |
| JP | H10-199525 A | | 7/1998 |
| JP | 2001-106534 A | | 4/2001 |
| JP | 2007042302 A | * | 2/2007 |
| JP | 2008-181839 A | | 8/2008 |
| JP | 2011-082150 A | | 4/2011 |
| JP | 2011-116580 A | | 6/2011 |
| JP | 2012-014887 A | | 1/2012 |
| JP | 2012-033397 A | | 2/2012 |
| JP | 2013-239434 A | | 11/2013 |
| JP | 2015-111560 A | | 6/2015 |
| KR | 10-2007-0097923 A | | 10/2007 |
| KR | 10-2010-0131736 A | | 12/2010 |
| KR | 10-2013-0001892 A | | 1/2013 |
| KR | 10-1253713 B1 | | 4/2013 |
| KR | 10-2013-0117340 A | | 10/2013 |
| KR | 10-2014-0117311 A | | 10/2014 |
| KR | 10-2015-0091183 A | | 8/2015 |
| KR | 10-1633256 B1 | | 6/2016 |
| KR | 10-1656935 B1 | | 9/2016 |
| KR | 10-1746187 B1 | | 6/2017 |
| WO | 2011-067935 A1 | | 6/2011 |
| WO | 2012-081518 A3 | | 6/2012 |
| WO | 2012-131881 A1 | | 10/2012 |
| WO | 2015-012282 A1 | | 1/2015 |

OTHER PUBLICATIONS

Written Opinion issued in International Application No. PCT/KR2017/014321 dated Mar. 23, 2018, with English translation.
Extended European Search Report issued in European Patent Application No. 17881416.6, dated Nov. 21, 2019.
Japanese Office Action dated Jan. 26, 2021 issued in Japanese Patent Application No. 2019-531454.
Chinese Office Action dated Oct. 11, 2021 issued in Chinese Patent Application No. 201780083220.7.

* cited by examiner

[Figure 1A]
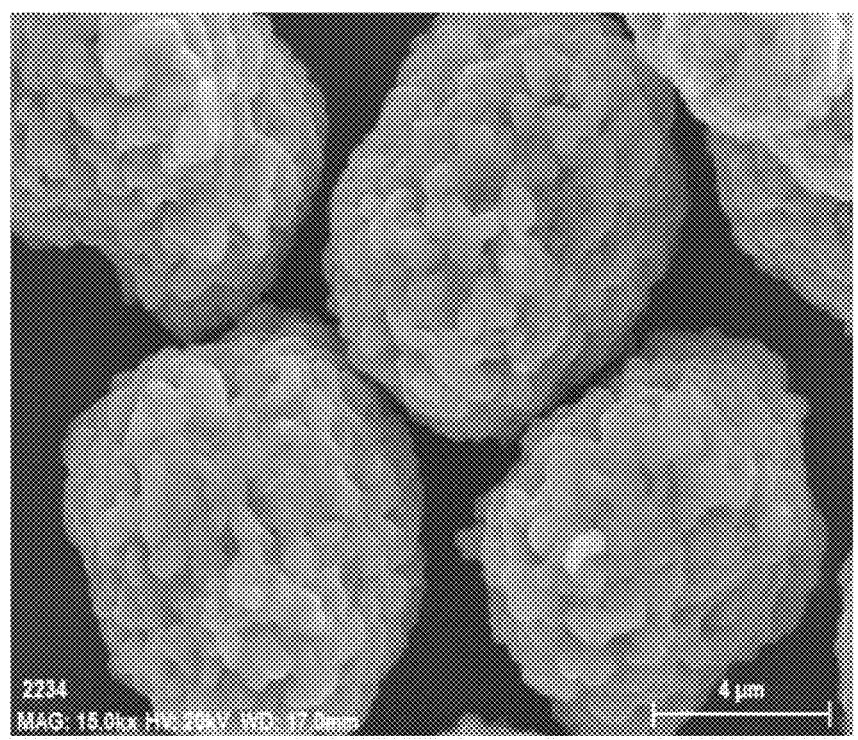

[Figure 1B]
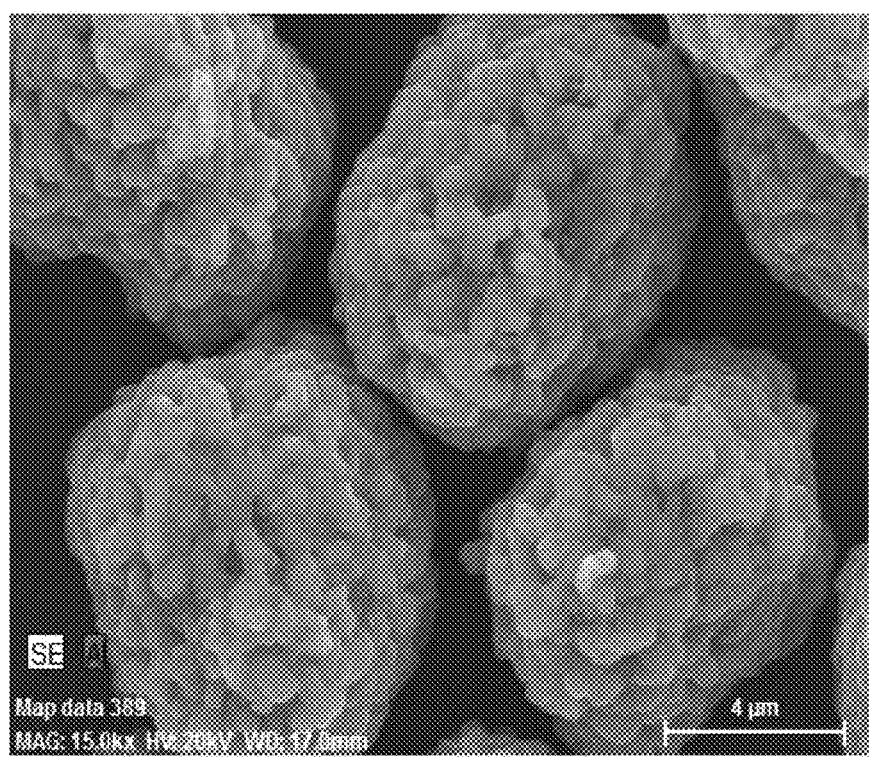

[Figure 1C]
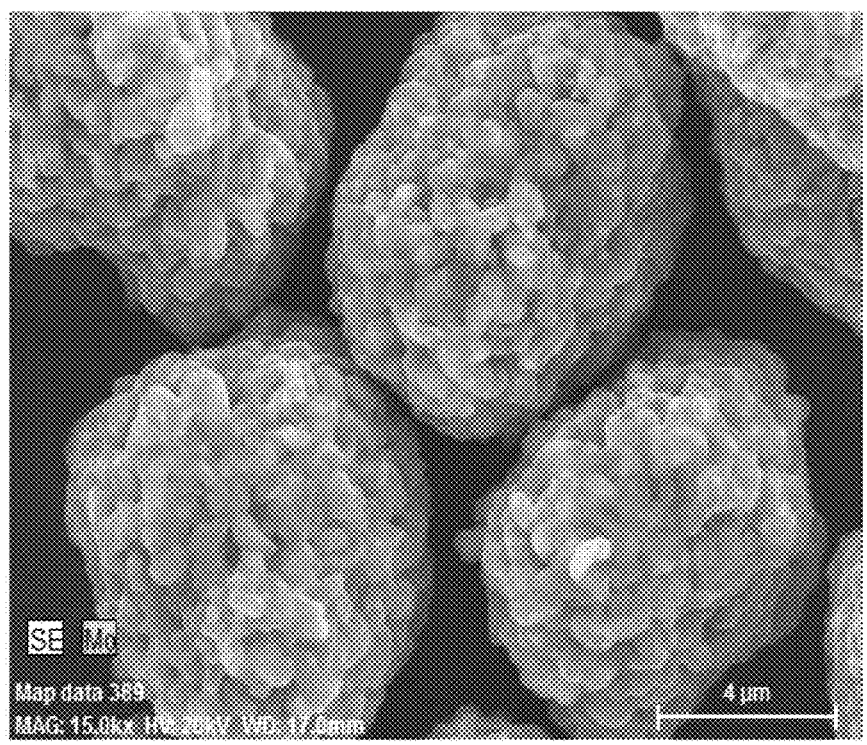

[Figure 1D]
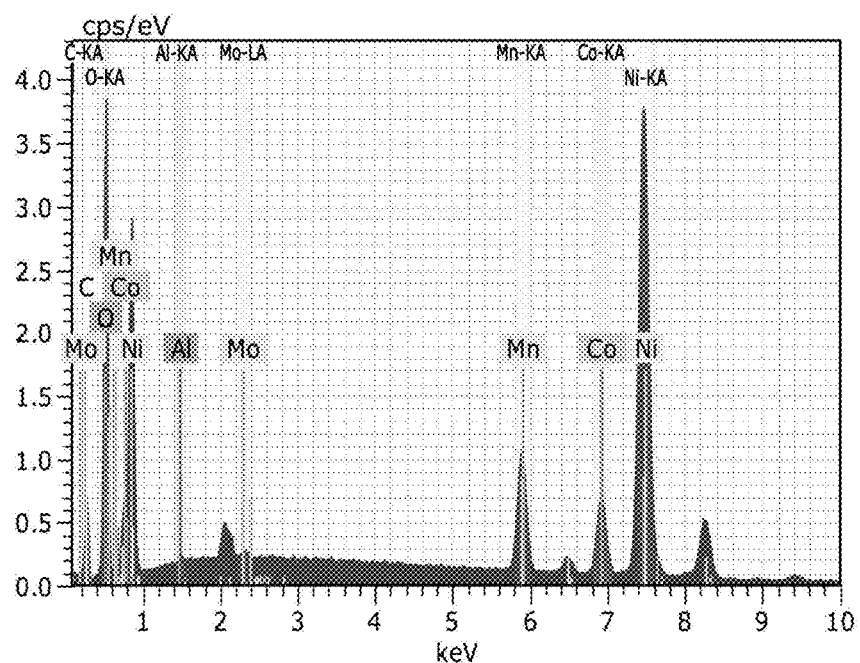

[Figure 2]
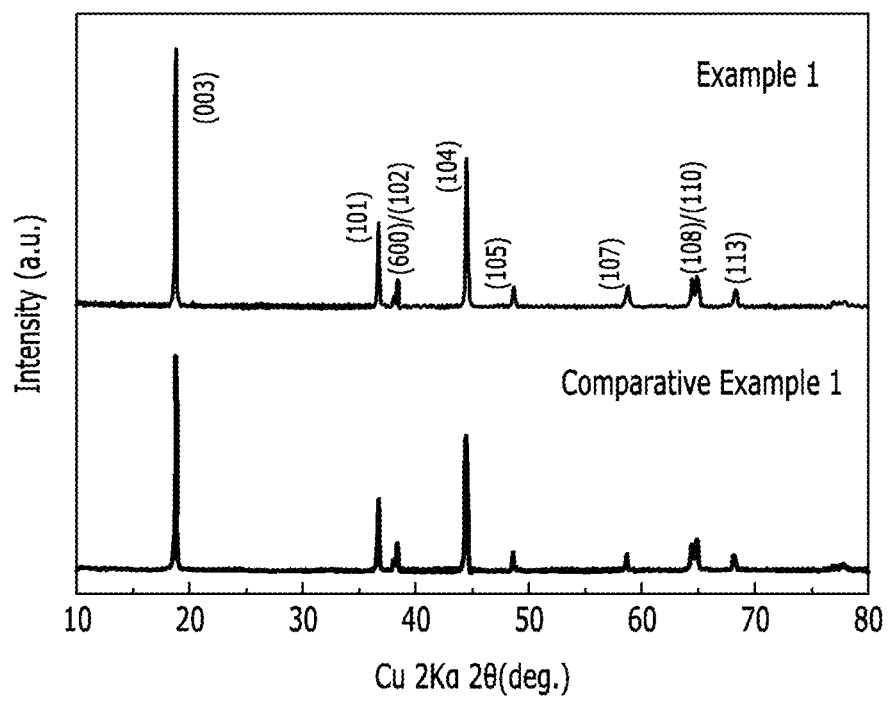

[Figure 3]
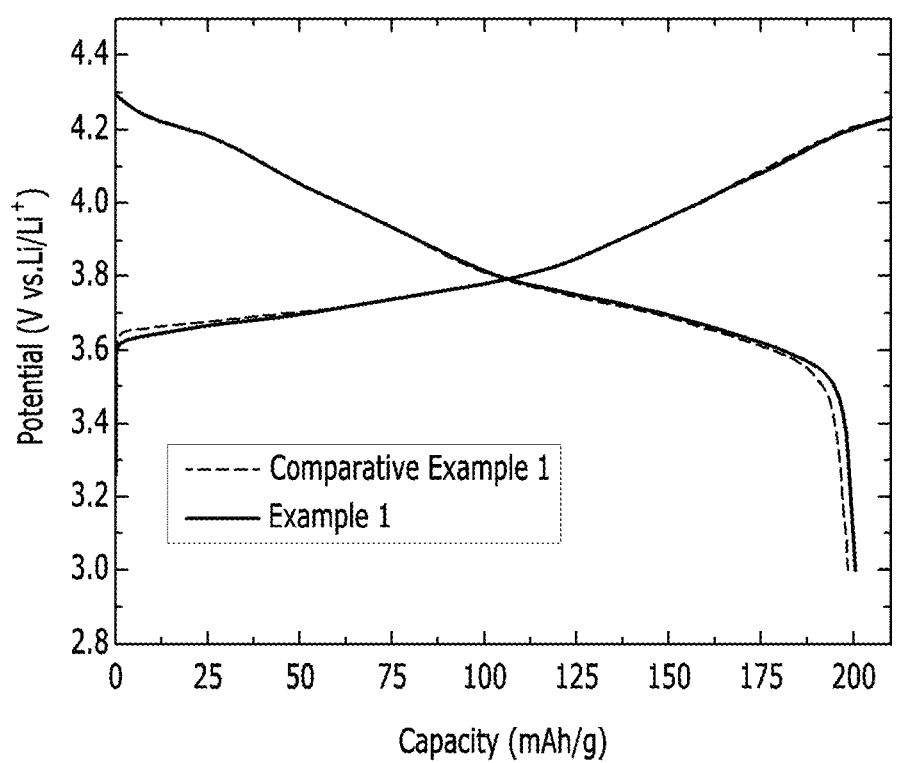

[Figure 4]
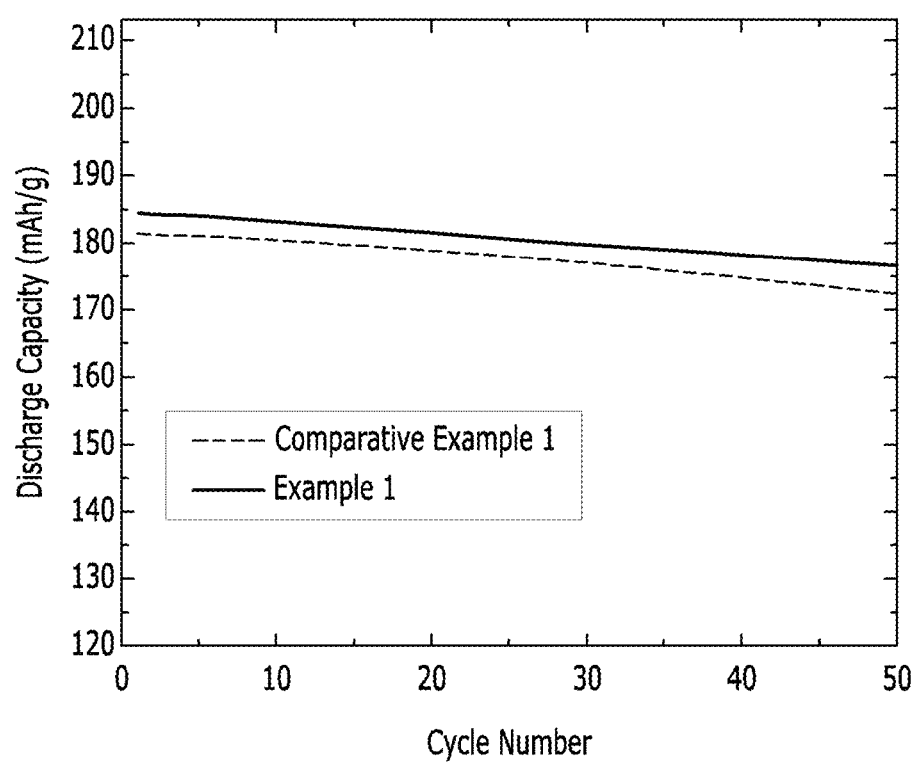

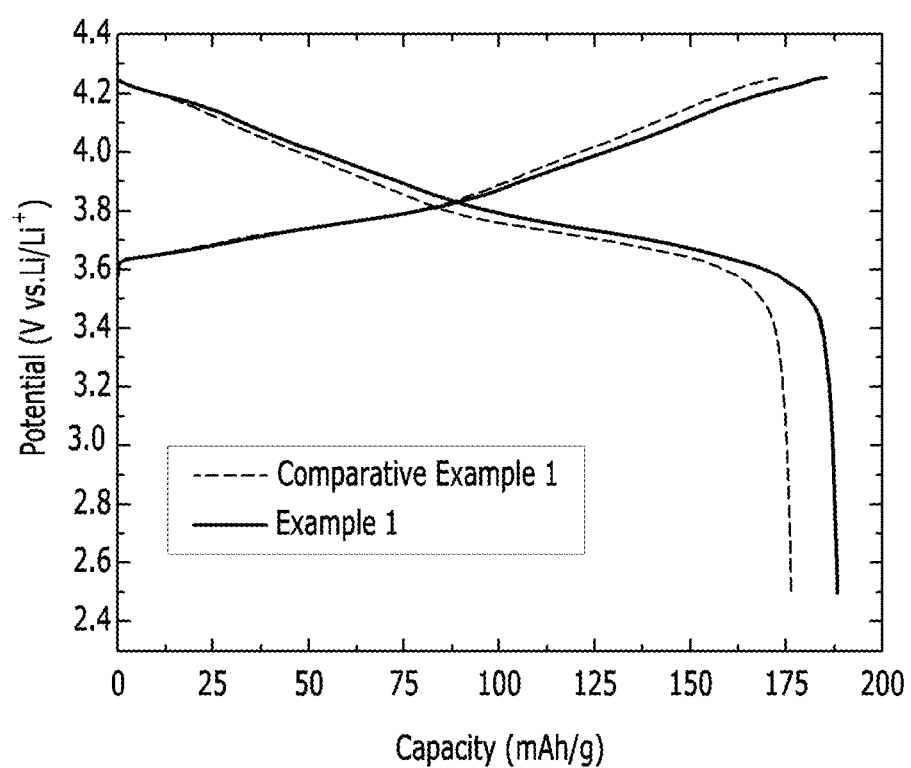
[Figure 5]

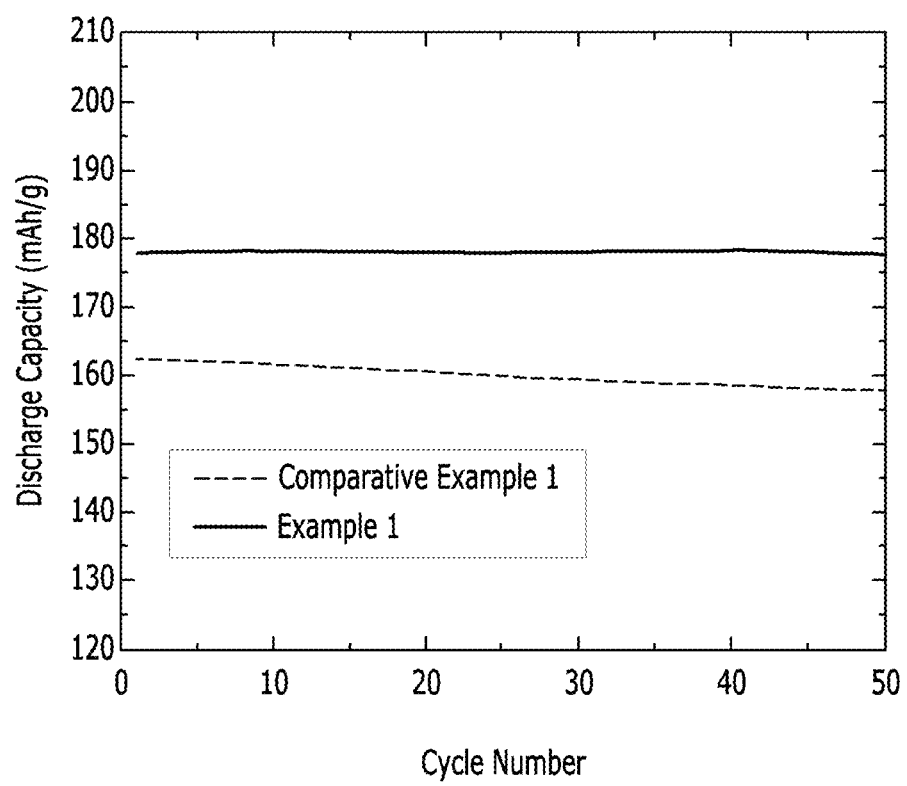
[Figure 6]

POSITIVE ELECTRODE ACTIVE MATERIAL FOR LITHIUM SECONDARY BATTERY, METHOD FOR PREPARING SAME, AND LITHIUM SECONDARY BATTERY COMPRISING SAME

CROSS REFERENCE

This application is the U.S. National Phase under 35 U.S.C. § 371 of International Application No. PCT/KR2017/014321 filed on Dec. 7, 2017, which claims the benefit of Korean Application No. 10-2016-0168830 filed on Dec. 12, 2016, the entire contents of each are hereby incorporated by reference.

TECHNICAL FIELD

The present invention relates to a positive electrode active material for a lithium secondary battery, a method for preparing the same, and a lithium secondary battery comprising the same are disclosed.

BACKGROUND ART

A lithium secondary battery has recently drawn attention as a power source for small portable electronic devices. The lithium secondary battery uses an organic electrolyte solution and thereby, have twice as high a discharge voltage as a conventional battery using an alkali aqueous solution and accordingly, high energy density.

A lithium transition metal composite oxide which is a positive electrode active material of a lithium secondary battery includes a lithium oxide having a structure capable of intercalating lithium ions such as $LiCoO_2$, $LiMn_2O_4$, or $LiNi_{1-x}Co_xO_2$ (0<x<1). Currently, the most widely used positive electrode active material in the related industry is $LiCoO_2$, which may be used for a lithium secondary battery to improve charge and discharge and discharge voltage characteristics.

However, the lithium secondary battery including $LiCoO_2$ has a problem that its characteristics (for example, cycle-life characteristics, high temperature characteristics, thermal stability, etc.) may be deteriorated rapidly as charge and discharge are repeated. This is because $LiCoO_2$ therein tends to be degraded by the use of a lithium secondary battery, and this problem becomes even more serious at a high temperature.

In order to solve this problem, many researches are being conducted to improve an active material of a lithium secondary battery, such as attempting to coat a metal oxide or a fluorine oxide on the surface of commercially available $LiCoO_2$.

DISCLOSURE

Technical Problem

The present invention provides a positive electrode active material including metals having an average oxidation number of greater than 3.5 which are doped in a lithium transition metal composite oxide.

In addition, the technical object to be solved by the present invention is not limited to those mentioned above, and another technical objects which are not mentioned will be clearly understood by a person having an ordinary skill in the art to which the present invention pertains from the following description.

Technical Solution

A positive electrode active material for a lithium secondary battery according to an embodiment of the present invention includes a lithium transition metal composite oxide and doping metals doped in the lithium-transition metal composite oxide, wherein the doping metals includes at least two kinds and an average oxidation number of the doping metals is greater than 3.5.

The doping metals may include at least one ($M^1$) selected from the group including aluminum, boron, gallium, indium, titanium, zirconium, hafnium, vanadium, niobium, tantalum, and thallium and at least one ($M^2$) selected from the group including molybdenum, chromium, and tungsten.

The positive electrode active material for a lithium secondary battery may be represented by Chemical Formula 1.

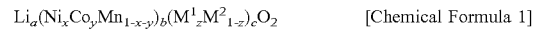

$$Li_a(Ni_xCo_yMn_{1-x-y})_b(M^1_zM^2_{1-z})_cO_2 \quad \text{[Chemical Formula 1]}$$

In Chemical Formula 1, 0.95≤a≤1.1, 0<b<1, 0<c<0.02, 0.5≤x<1, 0≤y≤0.2, and 0.5≤z<1.

The z may be greater than or equal to 0.7.
The x may be greater than or equal to 0.8.
The c may be greater than or equal to about 0.01.

A method of preparing a positive electrode active material for a lithium secondary battery according to an embodiment of the present invention includes 1) mixing a mixture of a transition metal precursor and a lithium precursor with a doping metal precursor having an average oxidation number of greater than +3.5; and firing the resultant mixture obtained in the 1) step to form a positive electrode active material, wherein the positive electrode active material is represented by Chemical Formula 1.

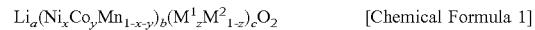

$$Li_a(Ni_xCo_yMn_{1-x-y})_b(M^1_zM^2_{1-z})_cO_2 \quad \text{[Chemical Formula 1]}$$

In Chemical Formula 1, 0.95≤a≤1.1, 0<b<1, 0<c<0.02, 0.5≤x<1, 0≤y≤0.2, and 0.5≤z<1. The firing may be performed at a temperature of 400° C. to 900° C. for 20 hours to 30 hours in a temperature increasing and decreasing sections.

A lithium secondary battery according to an embodiment of the present invention includes a positive electrode for a lithium secondary battery including the aforementioned positive electrode active material; a negative electrode overlapped therewith; and a separator and an electrolyte disposed between the positive electrode and the negative electrode.

Advantageous Effects

According to the present invention, a positive electrode active material for a lithium secondary battery being stable for a high temperature and heat and having improved reliability, and a lithium secondary battery including the same are provided.

DESCRIPTION OF THE DRAWINGS

FIGS. 1A to 1D relate to EDS element mapping images of a positive electrode active material in which Al/Mo are co-doped.

FIG. 2 shows an XRD graph of the positive electrode active material of Example 1 and Comparative Example 1.

FIG. 3 relates to initial charge and discharge profiles of the positive electrode active materials of Example 1 and Comparative Example 1.

FIG. 4 is a graph relating to room temperature cycle-life characteristics of the positive electrode active materials of Example 1 and Comparative Example 1.

FIG. 5 is a profile of 0.2 C charge/0.1 C discharge of the positive electrode active materials of Example 1 and Comparative Example 1.

FIG. 6 is a graph relating to room temperature cycle-life characteristics of the positive electrode active materials of Example 1 and Comparative Example 1.

MODE FOR INVENTION

Hereinafter, embodiments of the present invention will be described in detail, referring to the accompanying drawings. However, in the description of the present disclosure, descriptions for already known functions or components will be omitted for clarifying the gist of the present invention.

In order to clearly describe the present disclosure, parts which are not related to the description are omitted, and the same reference numeral refers to the same or like components, throughout the specification. In addition, since the size and the thickness of each configuration shown in the drawing are optionally represented for convenience of the description, the present disclosure is not limited to the illustration.

A positive electrode active material according to an embodiment of the present invention includes a compound represented by Chemical Formula 1.

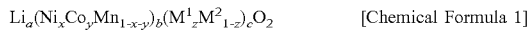

$$Li_a(Ni_xCo_yMn_{1-x-y})_b(M^1_zM^2_{1-z})_cO_2 \quad \text{[Chemical Formula 1]}$$

In Chemical Formula 1, $M^1$ is selected from the group consisting of aluminum (Al), boron (B), gallium (Ga), indium (In), titanium (Ti), zirconium (Zr), hafnium (Hf), vanadium (V), niobium (Nb), tantalum (Ta), thallium (Tl), and a combination thereof, and $M^2$ is selected from the group consisting of molybdenum (Mo), chromium (Cr), tungsten (W), and a combination thereof.

In Chemical Formula 1, $0.95 \leq a \leq 1.1$, $0<b<1$, $0<c<0.02$, $0.5 \leq x<1$, $0 \leq y \leq 0.2$, and $0.5 \leq z<1$.

More specifically, in Chemical Formula 1, the z may be greater than or equal to 0.6, and more specifically, the z may be in the range of 0.6 to 0.9 or 0.65 to 0.85. In Chemical Formula 1, if the z value satisfies the ranges, a secondary battery employing a positive electrode active material according to the present embodiment may greatly improve high rate discharge characteristics. Therefore, there is an advantage that a secondary battery having improved output characteristics may be realized.

Further, in Chemical Formula 1, the c may be less than or equal to 0.015, and more specifically the c may be in the range of 0.001 to 0.015. If the c value in Chemical Formula 1 satisfies the range, the cycle-life characteristics of the secondary battery using the positive electrode active material according to the present embodiment may be improved considerably.

The positive electrode active material represented by Chemical Formula 1 is based on a lithium-nickel-based oxide and includes the doping metals represented by $M^1$ and $M^2$ in Chemical Formula 1 to compensate structural instability of lithium-nickel-based oxide.

Specifically, in the positive electrode active material represented by Chemical Formula 1, a nickel content may be 50 to 95 mol % and more specifically, 70 to 95 mol % or 80 mol % to 93 mol % based on a total amount of the nickel, cobalt, and manganese components.

When contents of nickel, cobalt, and manganese satisfy the aforementioned condition, the positive electrode active material including these may improve battery characteristics of a secondary battery such as discharge voltages, capacity characteristics, and the like.

In addition, the nickel may have a concentration gradient from a core part to a surface part, and the concentration gradient may exist in a region of 95 length % of the entire radius. Herein, when a nickel concentration of the core part is 100 mol %, the nickel concentration of the surface part may gradually decrease to 50 mol %. For convenience, the nickel is taken as an example, but the description of the concentration gradient may also be applied to the manganese and cobalt.

In the positive electrode active material represented by Chemical Formula 1, the doping metals represented by $M^1$ and $M^2$ may be doped in a lithium cation site in order to prevent mixing of nickel cations into a lithium layer thereof.

According to an embodiment of the present invention, $M^1$ may be selected from the group consisting of aluminum (Al), boron (B), gallium (Ga), indium (In), titanium (Ti), zirconium (Zr), hafnium (Hf), vanadium (V), niobium (Nb), tantalum (Ta), thallium (Tl), and a combination thereof and $M^2$ may be selected from the group consisting of molybdenum (Mo), chromium (Cr), tungsten (W), and a combination thereof. The doping metals may include at least two kinds, and Chemical Formula 1 may be represented by $M^1$ and $M^2$ but it is not limited thereto and may include three or more kinds.

An average oxidation number of at least two kinds of the selected doping metals may be greater than +3.5. The present disclosure illustrates a positive electrode active material including two kinds of doping metals, whose average oxidation number is greater than 3.5, but is not limited thereto and may include greater than or equal to 3 or 4 kinds of doping metals, whose average oxidation number is greater than 3.5. Herein, at least two kinds of doping metals may have an average oxidation number of greater than 3.5 and specifically, in a range of 3.5 to 5 or 3.5 to 4.5. When the average oxidation number of the doping elements satisfies the range, electrochemical characteristics of a secondary battery manufactured by applying the positive electrode active material according to the present embodiment may be improved.

The doping metals represented by $M^1$ and $M^2$ may be positioned in a lithium cation site in the crystal structure of the positive electrode active material or an empty space in a crystal lattice and thus make a charge balance. Accordingly, the doping metals may suppress the cation mixing into the lithium cation site and work as a filler and thus promote structural stability of the positive electrode active material and reduce a natural loss of lithium cations.

On the other hand, the positive electrode active material for a secondary battery of the present embodiment may have an a-axis lattice parameter of 2.865 Å to 2.874 Å, and more specifically 2.868 Å to 2.873 Å. In addition, the positive electrode active material may have a c-axis lattice parameter of 14.180 Å to 14.214 Å and more specifically, 14.180 Å to 14.213 Å.

Herein, c-axis lattice parameter/a-axis lattice parameter values may be in the range of 4.945 to 4.950 and the crystalline size may be 82.5 nm to 100 nm, and more specifically 83 nm to 90 nm.

When the a-axis and c-axis lattice parameter values and the c-axis/a-axis lattice parameter values satisfy the ranges, structural stability of the positive electrode active material may be improved.

Hereinafter, a method of preparing a positive electrode active material having improved structural stability is provided.

A method of preparing a positive electrode active material for a lithium secondary battery according to an embodiment includes mixing a solution including a transition metal precursor and a lithium precursor with a metal precursor having an average oxidation number of greater than +3.5, and firing the same to prepare the positive electrode active material represented by Chemical Formula 1.

The preparing the lithium transition metal composite oxide in the step are not limited to the method and may be produced by a method commonly known in the art such as a solid-phase reaction method, a co-precipitation method, a gel method, and a hydrothermal synthesis method.

Specifically, each precursor respectively including nickel, cobalt, and manganese is dissolved in a solvent and then, co-precipitated to obtain a transition metal composite hydroxide. The transition metal composite hydroxide may be represented by $Me(OH)_2$, wherein the Me represents a transition metal and is represented by $Ni_xCo_yMn_{1-x-y}$ in Chemical Formula 1. Herein, the lithium precursor is additionally mixed therewith to prepare a lithium transition metal composite oxide.

Hereinafter, a doping metal precursor, for example, a first doping metal precursor and a second doping metal precursor are added thereto, and the obtained mixture may be fired. Herein, the first doping metal precursor may be $Al_2O_3$ and the second doping metal precursor may be $MoO_3$.

In the step of preparing the positive electrode active material, the firing may be performed by heat treating at a temperature ranging from 400° C. to 900° C. for 20 hours to 30 hours in a temperature increasing and decreasing sections, but is not limited thereto.

This specification also provides a positive electrode for a lithium secondary battery in which positive electrode material slurry including the aforementioned positive electrode active material is applied on the current collector. A positive electrode according to an embodiment may be manufactured by applying a positive electrode active material slurry including the positive electrode active material to a positive electrode current collector, and drying and compressing the same.

The positive electrode current collector may generally have a thickness of 3 μm to 500 μm, and is not particularly limited as long as it has high conductivity without causing chemical changes in the battery, but may be for example stainless steel, aluminum, nickel, titanium, fired carbon, or aluminum or stainless steel which is surface-treated with carbon, nickel, titanium, or silver.

The positive electrode active material slurry may be prepared by adding a binder, a conductive material, and an additive such as a filler, a dispersing agent, and the like to the positive electrode active material and mixing them.

The binder is a component that assists in binding between the positive electrode active material and the conductive material and binding to the current collector and may be generally from 1 wt % to 30 wt % based on a total amount of positive electrode active material. Such a binder is not particularly limited and conventional binders known in the art may be used, but may be for example one or more selected from the group consisting of polyvinylidene fluoride-co-hexafluoropropylene (PVDF-co-HFP), polyvinylidene fluoride, polyacrylonitrile, polymethylmethacrylate, polyvinyl alcohol, carboxylmethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), sulfonated EPDM, a styrene-butyrene rubber (SBR), and a fluorine rubber.

The conductive material may generally be added in an amount of 0.05 wt % to 5 wt % based on a total weight of the positive electrode active material. Such a conductive material is not particularly limited as long as it is not particularly limited and is conductive without causing side reactions with other components of the battery, but may be for example graphite such as natural graphite, artificial graphite, and the like; carbon black such as carbon black, acetylene black, ketjen black, channel black, furnace black, lamp black, thermal black, and the like; a conductive fiber such as a carbon fiber, a metal fiber, and the like; a metal powder such as carbon fluoride, aluminum, a nickel powder, and the like; a conductive whisker such as zinc oxide, potassium titanate, and the like; a conductive metal oxide such as titanium oxide and the like; a conductive material such as a polyphenylene derivative and the like.

The filler is a component that suppresses expansion of a positive electrode and may be used as needed. It is not particularly limited if it is a fiber-shaped material without inducing chemical changes in the battery, but may be for example a polyolefin-based polymer such as polyethylene polypropylene; a fiber-shaped material such as a glass fiber, a carbon fiber, and the like.

The dispersing agent (dispersion) is not particularly limited, but may be for example isopropyl alcohol, N-methyl-2-pyrrolidone (NMP), acetone, and the like.

The applying may be performed by a generally known method in the art but may be for example performed by supplying the positive electrode active material slurry on one upper surface of the positive electrode current collector and uniformly dispersing it using a doctor. In addition, it may be performed by methods such as die casting, comma coating, screen printing, and the like.

The drying may be performed within a day at a vacuum oven of 50° C. to 200° C., although not particularly limited.

An embodiment of the present invention provides a lithium secondary battery including the aforementioned positive electrode for a lithium secondary battery, a negative electrode, and a separator and an electrolyte disposed between the positive electrode and the negative electrode. The positive electrode may have improved structural stability by including the aforementioned positive electrode active material. Hereinafter, the description of the positive electrode is omitted.

The negative electrode may be manufactured by applying a negative active material slurry including a negative active material on one upper surface of the negative electrode current collector and then drying it, and the negative active material slurry may include a binder, a conductive material, and additives such as a filler and a dispersing agent in addition to a negative active material.

The negative electrode current collector may be the same as or included in the positive electrode current collector mentioned above.

The negative active material is not particularly limited and may be a carbon material in which lithium ions may be intercalated and deintercalated, lithium metal, silicon, or tin and the like, which is commonly known in this art. The carbon materials may preferably be used and for the carbon materials, low crystalline carbon and high crystalline carbon may be used. The low crystalline carbon may be soft carbon and hard carbon and the high crystalline carbon may be natural graphite, kish graphite, pyrolytic carbon, a mesophase pitch based carbon fiber, meso-carbon microbeads, mesophase pitches, and high temperature fired carbon such as petroleum-based and coal-based cokes.

Additives such as a binder, a conductive material, and an additive such as a filler and a dispersing agent used in the negative electrode may be the same as or included in the aforementioned manufacture of the positive electrode.

The separator may be an insulating thin film having high ion transmittance and mechanical strength, and may generally be a pore diameter of 0.01 μm to 10 μm and a thickness of 5 μm to 300 μm. The separator may be a porous polymer film, for example made of a polyolefin polymer, an ethylene homopolymer, a propylene homopolymer, an ethylene/butene copolymer, an ethylene/hexene copolymer, and an ethylene/methacrylate copolymer may be used alone or in a form of a stack thereof, or a generally porous non-woven fabric, for example a non-woven fabric made of a glass fiber having a high melting point or a polyethylene terephthalate fiber, but is not limited thereto.

In addition, the electrolyte may include organic solvents and lithium salts commonly used in electrolytes, and is not particularly limited.

The organic solvents may be at least one selected from the group consisting of propylene carbonate, ethylene carbonate, diethylcarbonate, dimethylcarbonate, ethylmethylcarbonate, methylpropylcarbonate, dipropylcarbonate, dimethylsulfoxide, acetonitrile, dimethoxyethane, diethoxyethane, vinylenecarbonate, sulfolane, gamma-butyrolactone, propylenesulfite, and tetrahydrofuran.

In addition, the electrolyte may further include pyridine, triethylphosphite, triethanolamine, cyclic ether, ethylene diamine, n-glyme(glyme), hexaphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like as needed in order to improve charge and discharge characteristics, flame retardancy characteristics, and the like. In some cases, it may further include a halogen-containing solvent such as carbon tetrachloride, ethylene trifluoride, and the like in order to impart non-flammability, it may further include a carbon dioxide gas in order to improve high temperature preservation characteristics, and it may further include FEC (fluoro-ethylene carbonate), PRS (propene sultone), FPC (fluoro-propylene carbonate), and the like.

The lithium secondary battery of the present invention may be manufactured by disposing a separator between a positive electrode and a negative electrode to form an electrode assembly, placing the electrode assembly in a cylindrical battery case or a prismatic battery case, and injecting an electrolyte. Alternatively, the electrode assembly may be stacked and may be impregnated with the electrolyte, and the resulting material sealed in a battery case.

The battery case used in the present invention may be adopted as commonly used in the related art, and there is no limitation on the external shape according to the use of the battery and may be for example, a cylindrical, square, pouch type or coin (coin) type or the like.

Hereinafter, preferable examples and experimental examples of the present invention are described. However, the following example is preferable examples of the present invention, and the present invention is not limited to the following example.

Example 1

Preparation of Precursor and Positive Electrode Active Material Simultaneously Doped with Al/Mo 1) Preparation of Precursor A precursor having a $(Ni_{0.8}Co_{0.1}Mn_{0.1})(OH)_2$ composition was prepared by a general co-precipitation method.

Specifically, in order to constantly maintain a nickel concentration of a core part but change a nickel concentration of a shell part, a feeding tank 1 having a high nickel concentration and a feeding tank 2 having a low nickel concentration were arranged in series. In the beginning, a high Ni solution of the feeding tank 1 alone was injected into a reactor in order to perform a co-precipitation, and then, a concentration gradient of the shell part was formed by injecting a solution from the feeding tank 2 to the feeding tank 1 and sequentially, from the feeding tank 1 to the reactor to change the nickel concentration during the co-precipitation.

$NiSO_4 \cdot 6H_2O$, $CoSO_4 \cdot 7H_2O$, and $MnSO_4 \cdot H_2O$ were dissolved in ultrapure water (DI water), and $NH_4(OH)$ was used as a co-precipitation chelating agent, and NaOH was used for pH adjustment. In order to prevent oxidation of nickel during the co-precipitation, $N_2$ was purged, and a temperature of the reactor was maintained at 50° C. The prepared precursor was filtered, washed with ultrapure water, and dried in a 100° C. oven for 24 hours.

2) Preparation of Positive Electrode Active Material

The core-shell gradient precursor $(Ni_{0.8}Co_{0.1}Mn_{0.1}(OH)_2)$ prepared according to the 1), $LiOH \cdot H_2O$ (Battery Grade, Samchun Chemicals), $Al_2O_3$ (2N, Samchun Chemicals), and $MoO_3$ (2N5, Samchun Chemicals) were weighed according to a mole ratio and then, uniformly mixed and fired under an oxygen atmosphere. Specifically, the fired product was inserted into a tube furnace (an interior diameter of 50 mm, a length of 1,000 mm) and then, fired, while oxygen was injected thereinto at 200 mL/min. The firing was performed by maintaining 480° C. for 5 hours and then, 800° C. for 16 hours, wherein the temperature was increased at 5° C./min.

Al and Mo was used in a mole ratio of 0.8:0.2 to obtain an average oxidation number of 3.6, and $(Ni_{0.8}Co_{0.1}Mn_{0.1}(OH)_2):(Al_{0.8}Mo_{0.2})$ were used in a ratio of 0.995:0.005 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.995}(Al_{0.8}Mo_{0.2})_{0.005}O_2$ and thus prepare a positive electrode active material having a total composition of $Li_{1.05}(Ni_{0.8}Co_{0.1}Mn_{0.1})_{0.995}(Al_{0.8}Mo_{0.2})_{0.005}O_2$ according to Example 1.

Example 2

A precursor was prepared according to the same method as the 1) of Example 1 and then, used to prepare a positive electrode active material according to the same method as the 2) of Example 1 except that the following conditions were changed.

Al and Mo were used in a mole ratio of 0.83:0.17 to obtain an average oxidation number of 3.51, and $(Ni_{0.8}Co_{0.1}Mn_{0.1}(OH)_2):(Al_{0.83}Mo_{0.17})$ were used in a ratio of 0.995:0.005 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.995}(Al_{0.83}Mo_{0.17})_{0.005}O_2$ and thus prepare a positive electrode active material having a total composition of $Li_{1.05}(Ni_{0.8}Co_{0.1}Mn_{0.1})_{0.995}(Al_{0.83}Mo_{0.17})_{0.005}O_2$ according to Example 2.

Example 3

A precursor was prepared according to the same method as the 1) of Example 1 and then, used according to the same method as the 2) of Example 1 to prepare a positive electrode active material except that the following conditions were changed.

Al and Mo were used in a mole ratio of 0.75:0.25 to obtain an average oxidation number of 3.75, and $(Ni_{0.8}Co_{0.1}Mn_{0.1}(OH)_2):(Al_{0.75}Mo_{0.25})$ were used in a ratio of 0.995:0.005 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.995}(Al_{0.75}Mo_{0.25})_{0.005}O_2$ and thus prepare a positive electrode active material having a total composition of $Li_{1.05}(Ni_{0.8}Co_{0.1}Mn_{0.1})_{0.995}(Al_{0.75}Mo_{0.25})_{0.005}O_2$ according to Example 3

Example 4

A precursor was prepared according to the same method as the 1) of Example 1 and then, used according to the same method as the 2) of Example 1 to prepare a positive electrode active material except that the following conditions were changed.

Al and Mo were used in a mole ratio of 0.7:0.3 to obtain an average oxidation number of 3.9, and $(Ni_{0.8}Co_{0.1}Mn_{0.1}(OH)_2):(Al_{0.7}Mo_{0.3})$ were used in a ratio of 0.995:0.005 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.995}(Al_{0.7}Mo_{0.3})_{0.005}O_2$ and thus prepare a positive electrode active material having a total composition of $Li_{1.05}(Ni_{0.8}Co_{0.1}Mn_{0.1})_{0.995}(Al_{0.7}Mo_{0.3})_{0.005}O_2$ according to Example 4.

Example 5

A precursor was prepared according to the same method as the 1) of Example 1 and then, used according to the same method as the 2) of Example 1 to prepare a positive electrode active material except that the following conditions were changed.

Al and Mo were used in a mole ratio of 0.65:0.35 to obtain an average oxidation number of 4.05, and $(Ni_{0.8}Co_{0.1}Mn_{0.1}(OH)_2):(Al_{0.65}Mo_{0.35})$ were used in a ratio of 0.995:0.005 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.995}(Al_{0.65}Mo_{0.35})_{0.005}O_2$ and thus prepare a positive electrode active material having a total composition of $Li_{1.05}(Ni_{0.8}Co_{0.1}Mn_{0.1})_{0.995}(Al_{0.65}Mo_{0.35})_{0.005}O_2$ according to Example 5.

Example 6

A precursor was prepared according to the same method as the 1) of Example 1 and then, used according to the same method as the 2) of Example 1 to prepare a positive electrode active material except that the following conditions were changed.

Al and Mo were used in a mole ratio of 0.8:0.2 to obtain an average oxidation number of 3.6, and $(Ni_{0.8}Co_{0.1}Mn_{0.1}(OH)_2):(Al_{0.7}Mo_{0.3})$ were used in a ratio of 0.998:0.002 to maintain 0.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.998}(Al_{0.8}Mo_{0.2})_{0.002}O_2$ and thus prepare a positive electrode active material having a total composition of $Li_{1.05}(Ni_{0.8}Co_{0.1}Mn_{0.1})_{0.998}(Al_{0.8}Mo_{0.2})_{0.002}O_2$ according to Example 6.

Example 7

A precursor was prepared according to the same method as the 1) of Example 1 and then, used according to the same method as the 2) of Example 1 to prepare a positive electrode active material except that the following conditions were changed.

Al and Mo were used in a mole ratio of 0.8:0.2 to obtain an average oxidation number of 3.6, and $(Ni_{0.8}Co_{0.1}Mn_{0.1}(OH)_2):(Al_{0.8}Mo_{0.2})$ were used in a ratio of 0.99:0.01 to maintain 1 mol % of an Al/Mo doping material. In addition, Li in an excessive amount by 5 mol % was added thereto to have a ratio of $1.05:1=Li:(Ni_{0.8}Co_{0.1}Mn_{0.1})_{0.99}(Al_{0.8}Mo_{0.2})_{0.01}O_2$ and thus prepare a positive electrode active material having a total composition of $Li_{1.05}(Ni_{0.8}Co_{0.1}Mn_{0.1})_{0.99}(Al_{0.8}Mo_{0.2})_{0.01}O_2$ according to Example 7.

Example 8

A precursor was prepared according to the same method as the 1) of Example 1 and then, used according to the same method as the 2) of Example 1 to prepare a positive electrode active material except that the following conditions were changed.

Al and Mo were used in a mole ratio of 0.8:0.2 to obtain an average oxidation number of 3.6, and $(Ni_{0.8}Co_{0.1}Mn_{0.1}(OH)_2):(Al_{0.8}Mo_{0.2})$ were used in a ratio of 0.985:0.015 to maintain 1.5 mol % of an Al/Mo doping material. In addition, Li in an excessive amount by 5 mol % was added thereto to have a ratio of $1.05:1=Li:(Ni_{0.8}Co_{0.1}Mn_{0.1})_{0.985}(Al_{0.8}Mo_{0.2})_{0.015}O_2$ and thus prepare a positive electrode active material having a total composition of $Li_{1.05}(Ni_{0.8}Co_{0.1}Mn_{0.1})_{0.985}(Al_{0.8}Mo_{0.2})_{0.015}O_2$ according to Example 8.

Comparative Example 1

Preparation of Positive Electrode Active Material

The core-shell gradient precursor $(Ni_{0.8}Co_{0.1}Mn_{0.1}(OH)_2)$ according to Example 1 and $LiOH \cdot H_2O$ (Battery Grade, Samchun Chemicals) were uniformly mixed in a mole ratio of 1:1.05 and then, inserted in a tube furnace (an interior diameter of 50 mm, a length of 1,000 mm) and fired, while oxygen was injected thereinto at 200 mL/min. The firing condition was the same as that of Example 1.

Hereinafter, FIGS. 1A to 1D are referred for illustration. FIGS. 1A, 1B, 1C, and 1D show element-mapping results of the surfaces of the positive electrode active materials after the firing with EDS (Energy dispersive X-ray spectroscopy) in order to examine if Al/Mo were simultaneously co-doped. As shown in FIGS. 1A to 1D, Al and Mo were uniformly distributed in the positive electrode active materials.

Subsequently, XRD comparison results of Example 1 (the positive electrode active material including a material doped with 0.5 mol % of Al/Mo of NCM fractions) and Comparative Example 1 are shown in FIG. 2. XRD was X'Pert3 Powder (a model name) made by PANalytical Company, and a scan speed was 0.328°/s.

As shown in FIG. 2, Example 1 and Comparative Example 1 all showed that a (003) peak was well developed around 18.7° as a main peak and that (006)/(102) peak splitting between 37.5° and 38.5° and (108)/(110) peak splitting between 63.5° and 65.5° were observed. These results show that a satisfactory crystal structure was formed in a hexagonal layer. Accordingly, a typical hexagonal α-NaFeO2 (space group R-3m) structure was exhibited.

For a crystallographic examination due to the doping, a high score plus Rietveld software was used to perform a Rietveld analysis, and the results are shown in Table 1. For the Rietveld analysis, an XRD measurement range was fitted by using the results measured at 10° to 130°, and GOF (Goodness of Fit) was calculated into about 1.1.

R_factors near to 0.5 or reduced to less than or equal to 0.5, which indicated that a hexagonal structure was stably formed. Accordingly, the positive electrode active materials prepared by doping Al and Mo according to Examples 1 to 5 were structurally stable compared with the positive electrode active material according to Comparative Example 1. The cation mixing has a correlation with the hexagonal ordering. Specifically, firing at a low temperature decreases

TABLE 1

| | Average oxidation number | a (Å) | c (Å) | c/a | Crystalline size (nm) | I(003)/ I(104) | R-factor | GOF DELETEDTEXTS |
|---|---|---|---|---|---|---|---|---|
| Comparative Example 1 $Li_{1.05}(Ni_{0.8}Co_{0.1}Mn_{0.1})O_2$ | — | 2.875 | 14.215 | 4.944 | 82.1 | 1.13 | 0.545 | 1.0002 |
| Example 1 $Li_{1.05}(Ni_{0.8}Co_{0.1}Mn_{0.1})_{0.995}(Al_{0.8}Mo_{0.2})_{0.005}O_2$ | 3.6 | 2.870 | 14.200 | 4.948 | 86.3 | 1.16 | 0.506 | 1.1075 |
| Example 2 $Li_{1.05}(Ni_{0.8}Co_{0.1}Mn_{0.1})_{0.995}(Al_{0.83}Mo_{0.17})_{0.005}O_2$ | 3.51 | 2.870 | 14.197 | 4.947 | 86.5 | 1.22 | 0.502 | 1.0021 |
| Example 3 $Li_{1.05}(Ni_{0.8}Co_{0.1}Mn_{0.1})_{0.995}(Al_{0.75}Mo_{0.25})_{0.005}O_2$ | 3.75 | 2.871 | 14.205 | 4.948 | 86.5 | 1.17 | 0.498 | 1.1002 |
| Example 4 $Li_{1.05}(Ni_{0.8}Co_{0.1}Mn_{0.1})_{0.995}(Al_{0.7}Mo_{0.3})_{0.005}O_2$ | 3.9 | 2.870 | 14.202 | 4.948 | 86 | 1.18 | 0.499 | 1.0045 |
| Example 5 $Li_{1.05}(Ni_{0.8}Co_{0.1}Mn_{0.1})_{0.995}(Al_{0.65}Mo_{0.35})_{0.005}O_2$ | 4.05 | 2.871 | 14.207 | 4.948 | 86.8 | 1.20 | 0.498 | 1.0221 |

Referring to Table 1 showing a lattice parameter comparison of Example 1 (Al/Mo co-doping) and Comparative Example 1 (no doping), an a-axis and a c-axis tended to slightly decrease after the doping. The reason is that an ion radius ($r_{Al}^{3+}$=0.051 nm) of aluminum used as a doping material was smaller than that of nickel, and accordingly, the a-axis and the c-axis were assumed to decrease. However, since a doping amount of the aluminum was small, the decrease seemed to be insignificant.

This phenomenon appeared similar in Examples 2 to 5, in a state of fixing the total doping amount of aluminum and molybdenum into 0.5 mol %, when a mole ratio of the aluminum and the molybdenum were adjusted into a composition having an average oxidation number of greater than or equal to 3.5, the a-axis was in a range of 2.870 Å to 2.871 Å, the c-axis was in a range of 14.197 Å to 14.207 Å, and a c/a ratio was 4.948 on the average as shown in Examples 2 to 5. In other words, Examples 2 to 5 showed a little c/a increase on the average compared with Comparative Example 1 having no doping.

On the other hand, a crystalline size of the positive electrode active materials prepared by doping aluminum and molybdenum according to Examples 1 to 5 was in a range of 86 nm to 86.8 nm, which a little increased compared with that of Comparative Example 1 having no doping.

In addition, a cation mixing degree of $Li^+$ and $Ni^{2+}$ was measured through a peak area ratio of I(003)/I(104), and a R_factor showing hexagonal ordering was calculated through a peak area ratio of I(006)+I(102)/I(101).

The positive electrode active material of Comparative Example 1 showed a I(003)/I(104) ratio of 1.13, while the positive electrode active materials of Examples 1 to 5 showed a ratio near to 1.2. Accordingly, in the positive electrode active materials prepared by doping Al and Mo according to Examples 1 to 5, cation mixing of $Li^+$ and $Ni^{2+}$ was small.

However, as for the hexagonal ordering expressed by the R_factor, the positive electrode active material of Comparative Example 1 showed 0.545. On the contrary, the positive electrode active materials of Examples 1 to 5 showed a particle size, which may be disadvantageous in terms of the crystalline ordering but advantageous in terms of the cation mixing. On the contrary, firing at a high temperature increases the particle size, which may be advantageous in terms of the crystalline ordering but disadvantageous in terms of the cation mixing. When the cation mixing increases, battery performance may be deteriorated by decreasing mobility of lithium ions. Accordingly, the firing temperature needs to be optimized.

Referring to Table 1, as for the positive electrode active materials according to Examples 1 to 5, the firing temperature was a little higher, the cation mixing was less generated, while the hexagonal structure was stably formed, compared with that of Comparative Example 1. The reason is that doping elements according to Examples substituted a nickel site and thus stabilized a crystalline structure.

Electrochemical Evaluation 1 (Coin 2016, Using 88% of Positive Electrode Active Material)

A 2016 coin cell was manufactured to perform an electrochemical evaluation. Slurry for an electrode plate was prepared by respectively using the positive electrode active materials according to Examples 1 to 5 and Comparative Example 1. Specifically, each positive electrode active material:a conductive material (super-P):a binder (PVDF, KF1300) were used in a ratio of 88:8:4 wt %, and NMP (N-Methyl-2-pyrrolidone) was added thereto so that a solid content might be about 30% to adjust slurry viscosity and resultantly, obtain the slurry for an electrode plate.

The prepared slurry was coated on a 15 μm-thick Al foil by using a doctor blade and then, dried and compressed. The electrode loading amount was in a range of 9 to 10 mg/cm², and compression density was 3.1 g/cm³. An electrolyte solution was prepared by using 1M $LiPF_6$ in EC:EMC=1:2 (vol %) and then, used along with a PP separator and a lithium negative electrode (200 um, Honzo Metal Co., Ltd.) to manufacture a coin cell, and the coin cell was aged at room temperature for 10 hours to perform a charge/discharge test.

A capacity evaluation was performed by using 200 mAh/g as a reference capacity, and the charge and discharge was performed under a condition of CC/CV of 3.0 to 4.3 V and a cut-off of 0.005 C. Rate characteristics were evaluated by measuring capacity, while a C rate was sequentially increased into 1 C, 4 C, and 7 C under a charge condition of 0.1 C after twice repeating 0.1 C charge/0.1 C discharge. Cycle-life characteristics were evaluated through 50 times measurements at room temperature of 25° C. under a condition of 0.5 C charge/1 C discharge.

FIG. 3 shows a comparison result of initial charge/discharge curves of the positive electrode active material doped with 0.5 mol % of $Al_{0.8}Mo_{0.2}$ (Example 1) and the positive electrode active material having no doping (Comparative Example 1), in which Example 1 showed all increased initial charge capacity, initial discharge capacity, and initial efficiency compared with those of Comparative Example 1. In addition, referring to the initial charge curves, Example 1 showed not so large initial charge resistance as to that of Comparative Example 1. The cell evaluation was performed under a 1 C reference condition of 200 mA/g within a potential range of 4.3 V to 3.0 V.

Initial charge capacity, initial discharge capacity, initial efficiency, and cycle-life (0.1 C charge, 0.1 C discharge) characteristics according to these characteristics are shown in Table 2.

TABLE 2

| | 1st charge capacity (mAh/g@0.1 C) | 1st discharge capacity (mAh/g@0.1 C) | Initial efficiency (%) | Cycle-life % (@50 times, 5 C charge/1 C discharge) |
|---|---|---|---|---|
| Comparative Example 1 | 223.0 | 198.5 | 89.0 | 95 |
| Example 1 | 224.1 | 200.4 | 89.4 | 95.8 |
| Example 2 | 224.0 | 200.0 | 89.3 | 96 |
| Example 3 | 224.3 | 201.1 | 89.7 | 96 |
| Example 4 | 224.1 | 200.7 | 89.6 | 96.2 |
| Example 5 | 224.2 | 200.9 | 89.6 | 96 |

Regarding capacity and efficiency before and after doping of FIG. 3, compositions of the positive electrode active materials according to Examples 1 to 5 under a condition of greater than or equal to 3.5 of an average oxidation number of Al and Mo and the positive electrode active material having no doping of Comparative Example 1 and initial charge capacity, discharge capacity, initial efficiency, and a cycle-life (50 cycles) thereof are shown in Table 2.

Referring to Table 2, when a co-doping oxidation number of Al and Mo was greater than or equal to 3.5 like Examples 1 to 5, charge capacity, discharge capacity, and initial efficiency increased compared with those of Comparative Example 1 having no doping.

In addition, since the positive electrode active materials of Examples 1 to 5 showed a cycle-life of greater than or equal to 95.8% after the 50th charge and discharge, structural stability of the positive electrode active materials through co-doping of Al and Mo improved cycle-life characteristics of a lithium secondary battery manufactured by applying the same.

Subsequently, room temperature discharge capacities of the positive electrode active materials according to Examples 1 to 5 and Comparative Example 1 according to a C-rate increase are shown in Table 3. (200 mA/g with a reference to 1 C)

TABLE 3

| | 0.1 C | | 1 C | | 3 C | | 4 C | | 5 C | | 7 C | |
|---|---|---|---|---|---|---|---|---|---|---|---|---|
| | Discharge capacity (mAh/g) | Efficiency (%) | Discharge capacity (mAh/g) | Efficiency (%) | Discharge capacity (mAh/g) | Efficiency (%) | Discharge capacity (mAh/g) | Efficiency (%) | Discharge capacity (mAh/g) | Efficiency (%) | Discharge capacity (mAh/g) | Efficiency (%) |
| Comp. Ex. 1 | 198.5 | 100 | 181.4 | 91.4 | 170.9 | 86.1 | 166.7 | 84.0 | 161.0 | 81.1 | 137.9 | 69.5 |
| Ex. 1 | 200.4 | 100 | 184.5 | 92.1 | 174.4 | 87.2 | 171.5 | 85.6 | 166.8 | 83.2 | 151.3 | 75.5 |
| Ex. 2 | 200.0 | 100 | 184.7 | 92.4 | 175 | 87.5 | 171.9 | 86.0 | 166.2 | 83.1 | 150.2 | 75.1 |
| Ex. 3 | 201.1 | 100 | 185.3 | 92.1 | 175.2 | 87.1 | 172.5 | 85.8 | 166.5 | 82.8 | 151.5 | 75.3 |
| Ex. 4 | 200.7 | 100 | 185.7 | 92.5 | 175.8 | 87.6 | 172.7 | 86.0 | 167.1 | 83.3 | 153.2 | 76.3 |
| Ex. 5 | 200.9 | 100 | 185.8 | 92.5 | 175.6 | 87.4 | 173.1 | 86.2 | 167.9 | 83.6 | 154.2 | 76.8 |

Referring to Table 3, compared with the positive electrode active material not doped with aluminum and molybdenum according to Comparative Example 1, the positive electrode active materials doped with aluminum and molybdenum according to Examples 1 to 5 showed overall excellent output characteristics.

Specifically, the positive electrode active material not doped with aluminum and molybdenum according to Comparative Example 1 showed efficiency of 84% at 4 C/0.1 C, but the positive electrode active materials doped with aluminum and molybdenum according to Examples 1 to 5 showed efficiency of at least greater than or equal to 85.6% at 4 C/0.1 C.

In addition, in a composition fixed into $Al_xMo_y$, molybdenum showed a large influence on a high rate discharge of 4 C or higher, when an amount thereof was increased. Specifically, referring to the 7 C discharge results, when doped with $Al_{0.65}Mo_{0.35}$, an excellent output characteristic result of 76.8% was obtained. Accordingly, when aluminum and molybdenum were the co-doped, output characteristics may be improved.

FIG. 4 shows room temperature cycle-life results under a condition of 0.5 C charge/1 C discharge before/after doped with Al/Mo.

When not doped, 181.4 mAh/g of capacity at the initial 1 C discharge and 95% of a capacity retention after 50 cycles relative to the initial capacity were obtained, but when doped with Al/Mo, 184.5 mAh/g of capacity at the initial 1 C discharge and 95.8% of a capacity retention after the 50 cycles relative to the initial capacity were obtained. Accordingly, the Al/Mo doping had an improvement effect of increasing capacity and simultaneously, a cycle-life.

Electrochemical Evaluation 2 (Coin 2032, Using 92.5% of Positive Electrode Active Material)

A 2032 coin cell was manufactured to perform an electrochemical evaluation. Slurry for an electrode plate was prepared by respectively using the positive electrode active materials according to Examples 1 and 6 to 8 and Comparative Example 1.

Specifically, each positive electrode active material:a conductive material (denka black):a binder (PVDF, KF1100)

were used in a ratio of 92.5:3.5:4 wt %, and then, NMP (N-Methyl-2-pyrrolidone) was added thereto so that solid content might be about 30% to adjust slurry viscosity. The prepared slurry was coated on a 15 μm-thick Al foil by using a doctor blade and then, dried and compressed. An electrode loading amount was 14.6 mg/cm$^2$ and compression density was 3.1 g/cm$^3$. An electrolyte solution was prepared by adding 1.5% of VC to 1M LiPF$_6$ in EC:DMC:EMC=3:4:3 (vol %) and then, used along with a PP separator and a lithium negative electrode (200 um, Honzo Metal Co., Ltd.) to manufacture a coin cell, and the coin cell was aged for 10 hours at room temperature to perform a charge/discharge test.

A capacity evaluation was performed with a reference to 200 mAh/g, and the charge and discharge were performed under a condition of CC/CV of 2.5 to 4.25 V and a cut-off of 0.005 C. Rate characteristics were evaluated by measuring capacities, while a C rate was sequentially increased into 1 C, 2 C, and 4 C under a charge condition of 0.2 C after twice repeating 0.1 C charge/0.1 C discharge. Cycle-life characteristics were evaluated through 50 times measurements at room temperature of 25° C. under a condition of 0.5 C charge/0.5 C discharge.

FIG. 5 shows a comparison result of charge/discharge curves of a doped case with 0.5 mol % of Al$_{0.8}$Mo$_{0.2}$ and a case having no doping under the condition of the electrochemical Evaluation 2 (0.2 C charge, 0.1 C discharge). Example doped with aluminum and molybdenum showed discharge capacity of 188.3 mAh/g, but Comparative Example having no doping showed discharge capacity of 176.3 mAh/g. In other word, capacity (12 mAh/g) of Example was more largely realized.

Table 4 showed initial charge capacity, initial discharge capacity, and initial efficiency (0.2 C charge, 0.2 C discharge) under a condition of 0.2 C charge/0.2 C discharge, and Table 5 showed room temperature discharge capacities (with a reference to 0.2 C charge) according to a C-rate increase before and after the doping.

TABLE 4

|  | Comparative Example 1 Li$_{1.05}$(Ni$_{0.8}$Co$_{0.1}$Mn$_{0.1}$)O$_2$ | Example 1 Li$_{1.05}$(Ni$_{0.8}$Co$_{0.1}$Mn$_{0.1}$)$_{0.995}$(Al$_{0.8}$Mo$_{0.2}$)$_{0.005}$O$_2$ |
|---|---|---|
| 1$^{st}$ charge capacity (mAh/g) | 209.0 | 215.9 |
| 1$^{st}$ discharge capacity (mAh/g) | 173.0 | 183.5 |
| 1$^{st}$ efficiency (%) | 82.7 | 85.0 |

TABLE 5

|  |  | Comparative Example 1 Li$_{1.05}$(Ni$_{0.8}$Co$_{0.1}$Mn$_{0.1}$)O$_2$ | | Example 1 Li$_{1.05}$(Ni$_{0.8}$Co$_{0.1}$Mn$_{0.1}$)$_{0.995}$(Al$_{0.8}$Mo$_{0.2}$)$_{0.005}$O$_2$ | |
|---|---|---|---|---|---|
| Discharge capacity (mAh/g) | 0.1 C | 176.3 | 100% | 188.3 | 100% |
| | 1 C | 157.1 | 89.1% | 171.5 | 91.1% |
| | 2 C | 149.1 | 84.6% | 165.4 | 87.8% |
| | 4 C | 138.8 | 78.7% | 158.0 | 83.9% |

Referring to Table 4, Example 1 (doped with Al/Mo) showed increased initial efficiency. In addition, referring to Table 5, Comparative Example 1 (not doped with Al/Mo) showed discharge capacity of 78.7% at 4 C/0.2 C, but Example 1 (Li$_{1.05}$(Ni$_{0.8}$Co$_{0.1}$Mn$_{0.1}$)$_{0.995}$(Al$_{0.8}$Mo$_{0.2}$)$_{0.005}$O$_2$) showed discharge capacity of 83.9%. In other words, output characteristics were also greatly improved similarly to Table 3.

On the other hand, FIG. 6 shows room temperature cycle-life results of the positive electrode active materials according to Example 1 and Comparative Example 1 under a condition of 0.5 C charge, 0.5 C discharge, and 2.5 to 4.25 V charge and discharge.

Referring to FIG. 6, the positive electrode active material not doped with aluminum and molybdenum according to Comparative Example 1 showed 97.1% of a capacity retention after the 50th cycle relative to the 1$^{st}$ cycle. On the other hand, the positive electrode active material doped with aluminum and molybdenum according to Example 1 showed 99.8% of a capacity retention relative to the initial capacity under the same condition. Referring to these results, excellent electrochemical properties were obtained despite coin cell evaluation condition changes (a positive electrode composition, a loading amount increase, and a charge and discharge voltage adjustment).

Subsequently, Table 6 shows initial charge capacity, initial discharge capacity, initial efficiency, and cycle-life characteristics of the positive electrode active materials according to Examples 1 and 6 to 8 and Comparative Example 1.

TABLE 6

| | 1st charge capacity (mAh/g @ 0.1 C) | 1st discharge capacity (mAh/g @ 0.1 C) | Initial efficiency (%) | Cycle-life % (@50 times, 5 C charge/1 C discharge) |
|---|---|---|---|---|
| Comparative Example 1 $Li_{1.05}(Ni_{0.8}Co_{0.1}Mn_{0.1})O_2$ | 223.0 | 198.5 | 89.0 | 95 |
| Example 1 $Li_{1.05}(Ni_{0.8}Co_{0.1}Mn_{0.1})_{0.995}(Al_{0.8}Mo_{0.2})_{0.005}O_2$ | 224.1 | 200.4 | 89.4 | 95.8 |
| Example 6 $Li_{1.05}(Ni_{0.8}Co_{0.1}Mn_{0.1})_{0.998}(Al_{0.8}Mo_{0.2})_{0.002}O_2$ | 223.2 | 200.0 | 89.6 | 95.5 |
| Example 7 $Li_{1.05}(Ni_{0.8}Co_{0.1}Mn_{0.1})_{0.99}(Al_{0.8}Mo_{0.2})_{0.01}O_2$ | 223.0 | 198.3 | 88.9 | 97.2 |
| Example 8 $Li_{1.05}(Ni_{0.8}Co_{0.1}Mn_{0.1})_{0.985}(Al_{0.8}Mo_{0.2})_{0.015}O_2$ | 220 | 196.2 | 89.1 | 98.3 |

The positive electrode active materials of Examples 1 and 6 to 8 were prepared by co-doping aluminum and molybdenum but adjusting the total doping amount of the aluminum and the molybdenum in a state of fixing a doping composition as $Al_{0.8}Mo_{0.2}$.

Referring to Table 6, the positive electrode active materials of Examples 1 and 6 to 8 showed all increased initial charge capacity, discharge capacity, efficiency, and cycle-life characteristics compared with those of the positive electrode active material not doped with aluminum and molybdenum according to Comparative Example 1.

Specifically, as the total doping amount of aluminum and molybdenum was increased, capacity a little decreased, but cycle-life characteristics were remarkably improved.

Accordingly, when the total doping amount of aluminum and molybdenum was increased in the positive electrode active materials according to Examples 7 and 8, cycle-life characteristics of lithium secondary battery cells manufactured by applying the same were remarkably improved.

Hereinbefore, the certain exemplary embodiments of the present invention have been described and illustrated, however, it is apparent to a person with ordinary skill in the art that the present invention is not limited to the exemplary embodiment as described, and may be variously modified and transformed without departing from the spirit and scope of the present invention. Accordingly, the modified or transformed exemplary embodiments as such may not be understood separately from the technical ideas and aspects of the present invention, and the modified exemplary embodiments are within the scope of the claims of the present invention.

The invention claimed is:

1. A positive electrode active material for a lithium secondary battery, comprising
a lithium transition metal composite oxide represented by Chemical Formula 1:

$Li_a(Ni_xCo_yMn_{1-x-y})_b(M^1{}_zM^2{}_{1-z})_cO_2$     [Chemical Formula 1]

wherein, 0.95≤a≤1.1, 0<b<1, 0<c<0.02, 0.5≤x<1, 0≤y≤0.2, and 0.65≤z<0.83; doping metals ($M^1$ and $M^2$) are doped to a lithium cation site in the lithium-transition metal composite oxide, and $M^1$ is aluminum (Al) and $M^2$ is molybdenum (Mo); and
an average oxidation number of the doping metals Al and Mo is in a range of 3.5 to 5, wherein the oxidation number of Al is +3 and the oxidation number of Mo is +6.

2. The positive electrode active material for a lithium secondary battery of claim 1, wherein the x is greater than or equal to 0.8.

3. The positive electrode active material for a lithium secondary battery of claim 1, wherein the c is greater than or equal to about 0.015.

4. The positive electrode active material for a lithium secondary battery of claim 1, wherein the positive electrode active material for a secondary battery has an a-axis lattice parameter of 2.865 Å to 2.874 Å.

5. The positive electrode active material for a lithium secondary battery of claim 1, wherein the positive electrode active material for a secondary battery has a c-axis lattice parameter of 14.180 Å to 14.214 Å.

6. The positive electrode active material for a lithium secondary battery of claim 1, wherein the positive electrode active material for a secondary battery has c-axis lattice parameter/a-axis lattice parameter of 4.945 to 4.950.

7. A lithium secondary battery comprising
a positive electrode for a lithium secondary battery comprising the positive electrode active material of claim 1;
a negative electrode overlapped therewith; and
a separator interposed between the positive electrode and the negative electrode, and an electrolyte.

* * * * *